United States Patent
Yamasaki et al.

(10) Patent No.: US 8,766,824 B2
(45) Date of Patent: Jul. 1, 2014

(54) ELECTRONIC APPARATUS AND METHOD OF DETECTING INPUT

(75) Inventors: Hitoshi Yamasaki, Kawasaki (JP);
Yukihiro Sato, Kawasaki (JP);
Kazumasa Sugawara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 13/040,060

(22) Filed: Mar. 3, 2011

(65) Prior Publication Data

US 2011/0221616 A1   Sep. 15, 2011

(30) Foreign Application Priority Data

Mar. 12, 2010 (JP) .................................. 2010-55219

(51) Int. Cl.
*H03K 17/94* (2006.01)
*H03M 11/00* (2006.01)
*G06F 3/02* (2006.01)
*G09G 3/00* (2006.01)
*G06F 3/033* (2013.01)
*G09G 5/08* (2006.01)
*H01H 13/70* (2006.01)

(52) U.S. Cl.
CPC ..................................... *H01H 13/70* (2013.01)
USPC .............. 341/22; 341/26; 345/157; 345/168

(58) Field of Classification Search
USPC ............... 345/157–172; 379/368; 341/22–34
See application file for complete search history.

(56) References Cited

U.S. PATENT DOCUMENTS

| RE41,017 E | * | 12/2009 | Chiu et al. | 341/22 |
| 2009/0076504 A1 | * | 3/2009 | Schnitzler | 606/45 |
| 2009/0140890 A1 | * | 6/2009 | Bao et al. | 341/26 |
| 2011/0203910 A1 | * | 8/2011 | Miwa et al. | 200/16 R |

FOREIGN PATENT DOCUMENTS

| JP | 2001-351476 A | 12/2001 |
| JP | 2002-73262 A | 3/2002 |

OTHER PUBLICATIONS

Japanese Office Action mailed Oct. 1, 2013 for corresponding Japanese Application No. 2010-055219, with Partial English-language Translation.

* cited by examiner

*Primary Examiner* — Nabil Syed
*Assistant Examiner* — Jerold Murphy
(74) *Attorney, Agent, or Firm* — Fujitsu Patent Center

(57) ABSTRACT

An electronic apparatus includes a detection circuit having at least a first contact point, a second contact point and a third contact point; an input key unit changes states of the individual contact points based on an accepted input operation, and a detection-circuit control unit obtains a detection signal corresponding to changed states of the individual contact points from the detection circuit, and detects the input operation from the obtained detection signal.

5 Claims, 13 Drawing Sheets

FIG. 7

| DETECTION TIMING | T1 | T2 | T3 | T4 |
|---|---|---|---|---|
| INPUT SIGNAL | KBC1 | KBC1 | KBC2 | KBC2 |
| DETECTION SIGNAL | KBR0 | KBR5 | KBR0 | KBR5 |
| DIRECTION INPUT OPERATION — UP | 0 | 0 | 1 | 0 |
| DIRECTION INPUT OPERATION — UPPER RIGHT | 0 | 0 | 1 | 1 |
| DIRECTION INPUT OPERATION — RIGHT | 0 | 0 | 0 | 1 |
| DIRECTION INPUT OPERATION — LOWER RIGHT | 0 | 1 | 0 | 1 |
| DIRECTION INPUT OPERATION — DOWN | 0 | 1 | 0 | 0 |
| DIRECTION INPUT OPERATION — LOWER LEFT | 1 | 1 | 0 | 0 |
| DIRECTION INPUT OPERATION — LEFT | 1 | 0 | 0 | 0 |
| DIRECTION INPUT OPERATION — UPPER LEFT | 1 | 0 | 1 | 0 |

ELECTRONIC APPARATUS AND METHOD OF DETECTING INPUT

CROSS-REFERENCE TO RELATED APPLICATIONS

This application is based upon and claims the benefit of priority from the prior Japanese Patent Application No. 2010-55219 filed on Mar. 12, 2010, the entire contents of which are incorporated herein by reference.

FIELD

The embodiments discussed herein are relates to an electronic apparatus and a method of detecting an input.

BACKGROUND

Electronic apparatuses, such as mobile terminal apparatuses, for example, have become increasingly multi-functional. For example, some of mobile terminal apparatuses are capable of performing various kinds of information processing, such as voice communication, document creation, access to a Web site, transmission and receiving of an email, playback of music, image display of a photograph, e.g., playback of a moving image. In order to make it possible for a user to use such functions comfortably, input operations by the user have become advanced and complicated. For example, there are electronic apparatuses provided with a cross-shaped key indicating in up, down, right, and left directions for instructing a cursor move, e.g., or a multi-directional key capable of operations in diagonal directions.

In some of the electronic apparatuses capable of such advanced operation, for example, an input operation on a diagonal move by a cross-shaped key is received by a cross-shaped key having four electrical contact points in up, down, right, and left directions, respectively. When a user presses such a cross-shaped key in a diagonal direction, two contacts adjacent to a position physically pressed are detected among contact points in the four directions. For example, if the user presses the key in an upper right direction, the up and the right contact points are detected.

In an electronic apparatus disclosed in Japanese Laid-open Patent Publication No. 2001-351476, for example, a structure has been disclosed of a multi-directional switch in which four contact points are added, and individual inputs in diagonal directions are allocated to the added four contact points, respectively, so that a multi-directional input is allowed. The multi-directional inputs are, for example, inputs in eight directions.

In the above-described electronic apparatus capable of multi-directional operations using the four contact points, a user brings two contact points into contact out of the contact points in the up, down, right, and left directions by pressing a place at which there is no contact point with no operational feeling. Accordingly, the user tries to press the two contact points in a direction having no contact point in order to make connections on the two contact points at the same time. Thus, in the above-described electronic apparatus having the four contact points, there is a problem in that the operation is troublesome and unstable for the user.

There is an improved technique which allows a user to easily perform operations in diagonal directions by achieving a multi-directional switch structurally. However, in the multi-directional switch structurally, contact points are provided to be specifically allocated to points of contact in a key-matrix circuit, or signals of points of contact in a key-matrix circuit are input into a control unit as direct interrupt signals, for example. Accordingly, in an electronic apparatus provided with that switch, there are problems that cause occupation of a few key-matrix circuits, and an increase in the number of signal lines, for example, which results in expansion of a circuit size.

SUMMARY

According to an aspect of the embodiment, an electronic apparatus for detecting an input operation using a plurality of contact points, the electronic apparatus includes a detection circuit; an input key unit; and a detection-circuit control unit, wherein the detection circuit includes at least a first contact point capable of changing between a connected state in which a first signal line and a second signal line are electrically connected, and an open state in which the first signal line and the second signal line are not electrically connected, a second contact point capable of changing between a connected state in which the first signal line and the second signal line are electrically connected and the second signal line and a third signal line are electrically connected, and an open state in which the first signal line and the second signal line are not electrically connected and the second signal line and the third signal line are not electrically connected, and a third contact point capable of changing between a connected state in which the second signal line and the third signal line are electrically connected, and an open state in which the second signal line and the third signal line are not electrically connected, the input key unit changes states of the plurality of contact points based on an accepted input operation, and the detection-circuit control unit obtains a detection signal corresponding to changed states of the plurality of contact points from the detection circuit, and detects the input operation from the obtained detection signal.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 is a diagram illustrating relationships between the direction input operations according to the second embodiment and the detection signals of the key matrix circuit;

DESCRIPTION OF EMBODIMENTS

In the following, a description will be given of the present embodiment with reference to the drawings.

[First Embodiment]

Figure 1:
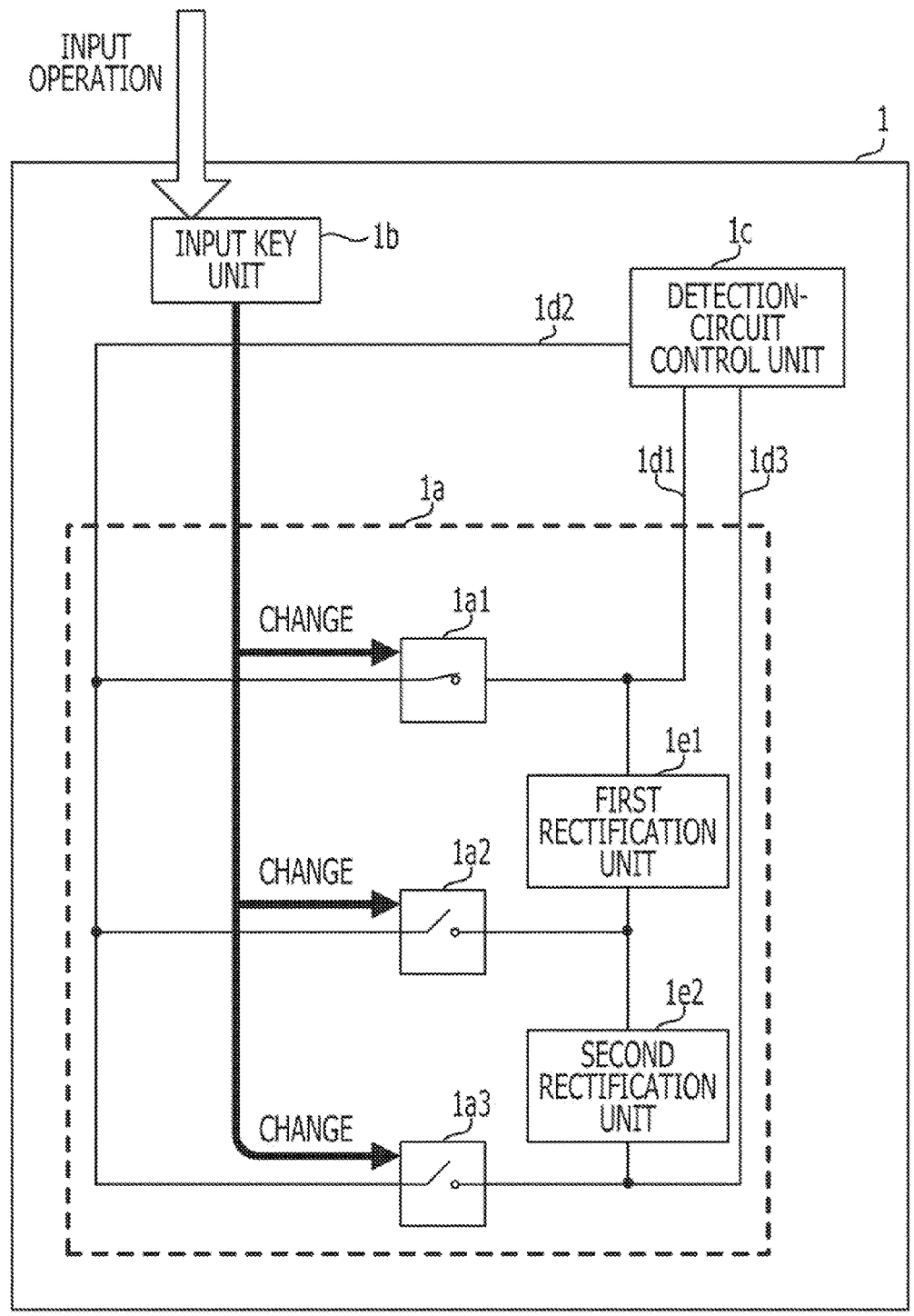
FIG. 1 is a diagram illustrating an electronic apparatus according to a first embodiment.

FIG. 1 is a diagram illustrating an electronic apparatus according to a first embodiment. For example, an electronic apparatus 1 according to the first embodiment may be an electronic apparatus, such as a mobile terminal apparatus, a mobile telephone, a mobile television, a portable video game machine, or an electronic dictionary. In addition, the electronic apparatus 1 may be an information processing apparatus, e.g., a notebook-sized computer or a PDA (Personal Digital Assistant).

The electronic apparatus 1 includes a detection circuit 1a, an input key unit 1b, a detection-circuit control unit 1c, a first signal line 1d1, a second signal line 1d2, and a third signal line 1d3. The electronic apparatus 1 detects a user-input operation by a plurality of contact points capable of changing whether to electrically connect the first signal line 1d1 to the third signal line 1d3 with each other.

The detection circuit 1a includes a first contact point 1a1, a second contact point 1a2, a third contact point 1a3, a first rectification unit 1e1, and a second rectification unit 1e2. The first contact point 1a1 to the third contact point 1a3 are related to user-input operations. When the user performs a predetermined input operation, e.g., by pressing the input key unit 1b, the corresponding contact point is changed to a connected state on the basis of the user-input operation. When the input operation is complete, the contact point having been in a connected state by the input operation is changed to an open state. In the first embodiment, a signal is input from the detection-circuit control unit 1c to the detection circuit 1a on the second signal line 1d2, and detection signals are output from the first signal line 1d1 and the third signal line 1d3. The detection signals are detected by the detection-circuit control unit 1c so that the user-input operation is detected.

The first contact point 1a1 is capable of changing between a connected state in which the first signal line 1d1 and the second signal line 1d2 are electrically connected, and an open state in which the first signal line 1d1 and the second signal line 1d2 are electrically not connected. That is to say, when the first contact point 1a1 becomes the connected state, the detection signal is output on the first signal line 1d1.

The second contact point 1a2 is capable of changing between a connected state in which the first signal line 1d1 and the second signal line 1d2 are electrically connected and the second signal line 1d2 and the third signal line 1d3 are electrically connected, and an open state in which the first signal line 1d1 and the second signal line 1d2 are electrically not connected and the second signal line 1d2 and the third signal line 1d3 are electrically not connected. That is to say, when the second contact point 1a2 becomes a connected state, detection signals are output from the first signal line 1d1 and the third signal line 1d3. Accordingly, when the second contact point 1a2 becomes a connected state, the same detection signals are output from the first signal line 1d1 and the third signal line 1d3 as in the case where the first contact point 1a1 is in a connected state, and the third contact point 1a3 is a connected state.

The third contact point 1a3 is capable of changing between a connected state in which the second signal line 1d2 and the third signal line 1d3 are electrically connected, and an open state in which the second signal line 1d2 and the third signal line 1d3 are electrically not connected. That is to say, when the third contact point 1a3 becomes the connected state, the detection signal is output from the third signal line 1d3.

The input key unit 1b accepts a user-input operation, and changes states of the first contact point 1a1 to the third contact point 1a3 held by the detection circuit 1a to the connected state and the open state on the basis of the accepted input operation. Thereby, the user-input operation accepted by the input key unit 1b is reflected on the states of the first contact point 1a1 to the third contact point 1a3 of the detection circuit 1a.

The detection-circuit control unit 1c provides an input signal to the detection circuit 1a, obtains a detection signal output from the detection circuit 1a, and detects an input operation from the obtained detection signal. When the detection-circuit control unit 1c provides an input signal to the detection circuit 1a through the second signal line 1d2, if a detection signal is detected from the first signal line 1d1, and a detection signal is not detected on the third signal line 1d3, the detection-circuit control unit 1c determines that the first contact point 1a1 is in a connected state, and detects an input operation corresponding to the first contact point 1a1. When the detection-circuit control unit 1c provides an input signal to the detection circuit 1a through the second signal line 1d2, if a detection signal is not detected on the first signal line 1d1, and a detection signal is detected on the third signal line 1d3, the detection-circuit control unit 1c determines that the third contact point 1a3 is in a connected state, and detects an input operation corresponding to the third contact point 1a3. When the detection-circuit control unit 1c provides an input signal to the detection circuit 1a on the second signal line 1d2, if a detection signal is detected on the first signal line 1d1, and a detection signal is detected on the third signal line 1d3, the detection-circuit control unit 1c determines that the second contact point 1a2 is in a connected state, and thereby detects an input operation corresponding to the second contact point 1a2.

Thereby, when the user performs an input operation corresponding to the second contact point 1a2, it is possible for the detection-circuit control unit 1c to detect that the input operation corresponding to the second contact point 1a2 is performed in the case where at least one of the first contact point 1a1 and the third contact point 1a3 is in a connected state together with the second contact point 1a2, and in the case where the first contact point 1a1 and the third contact point 1a3 are both in a connected state, but the second contact point 1a2 is in an open state.

When the second contact point 1a2 is changed into a connected state, the first rectification unit 1e1 and the second rectification unit 1e2 prevents the first signal line 1d1 and the third signal line 1d3 from being short-circuited.

In the first embodiment, a description has been given that the detection-circuit control unit 1c provides an input signal to the detection circuit 1a through the second signal line 1d2, and detection signals are output from the first signal line 1d1 and the third signal line 1*d*3. However, the detection-circuit control unit 1*c* may provide signals to the detection circuit 1*a* on the first signal line 1*d*1 and the third signal line 1*d*3, respectively, identifiably for each signal line, using different timing, for example. Detection signals corresponding to the signals input into the first signal line 1*d*1 and the third signal line 1*d*3, respectively, may be output from the second signal line 1*d*2. And the detection-circuit control unit 1*c* may detect these detection signals, and thereby may detect the user-input operation.

In the first embodiment, the detection circuit 1*a* has three contact points, the first contact point 1*a*1 to the third contact point 1*a*3. However, the number of contact points is not limited to this, and may be four or more. The detection circuit 1*a* has three signal lines, the first signal line 1*d*1 to the third signal line 1*d*3. However, the number of signal lines is not limited to this, and may be four or more.

In the first embodiment, when the second contact point 1*a*2 is in a connected state, the first rectification unit 1*e*1 and the second rectification unit 1*e*2 prevent the first signal line 1*d*1 and the third signal line 1*d*3 from being short-circuited. However, the configuration is not limited to this. The first signal line 1*d*1 and the third signal line 1*d*3 may be insulated, and may be individually connected to the second contact point 1*a*2 without disposing the first rectification unit 1*e*1 and the second rectification unit 1*e*2. When the second contact point 1*a*2 is in a connected state, the first signal line 1*d*1 and the second signal line 1*d*2, and the first signal line 1*d*1 and the third signal line 1*d*3 may be allowed to be individually connected separately in the inside of the second contact point 1*a*2.

By such an electronic apparatus 1, if a corresponding input operation is performed, the input operation is detected using a contact point performing a substantially identical connection to addition of adjacent contact points on the right side and the left side so that it is possible to restrain expansion of a circuit size while substantially preventing deterioration in the operationality of the user at input operation time.

In a second embodiment described below, as an example of application of an electronic apparatus 1 according to the first embodiment, a mobile terminal apparatus is taken as an example. The electronic apparatus 1 may be applied to various electronic apparatuses in addition to the mobile terminal apparatus.

[Second Embodiment]

Figure 2:
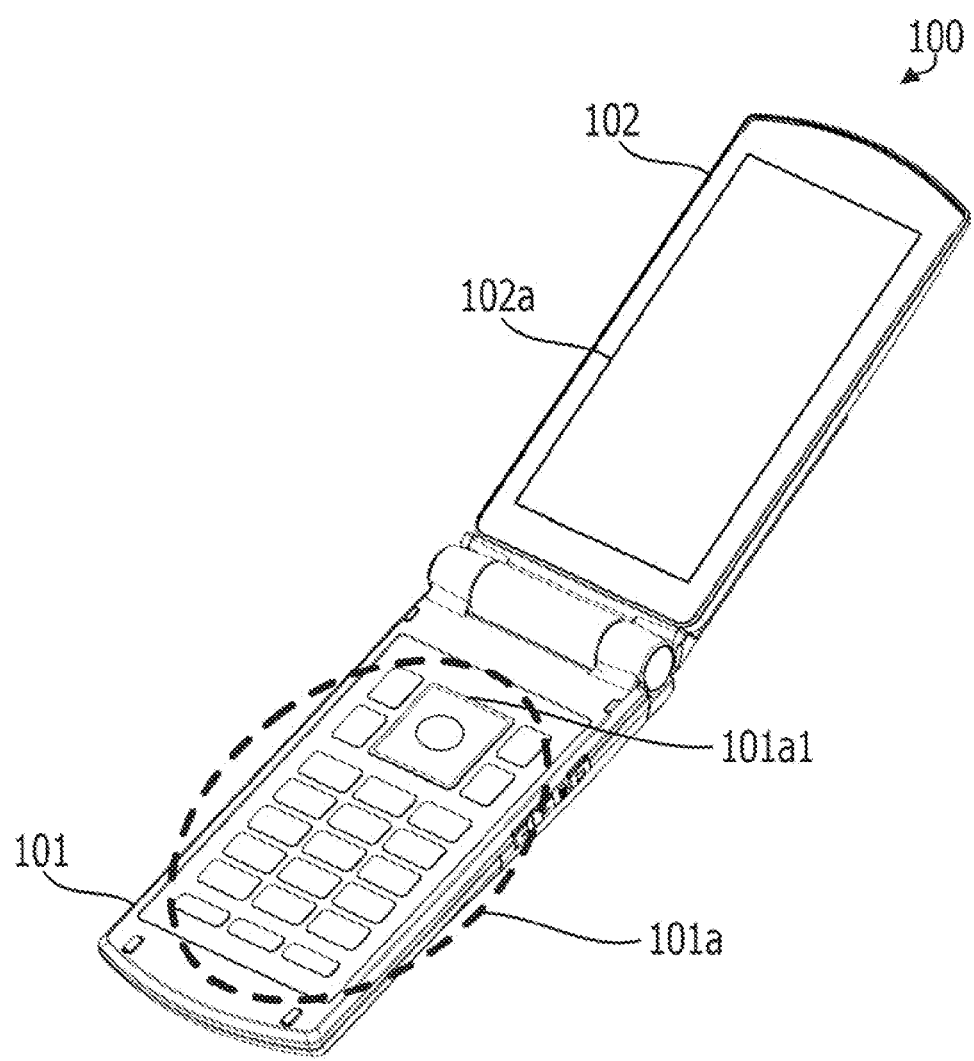
FIG. 2 is a diagram illustrating an outer view of a mobile terminal apparatus according to the second embodiment.

FIG. 2 is a diagram illustrating an outer view of a mobile terminal apparatus according to the second embodiment. A mobile terminal apparatus 100 according to the second embodiment is an example of a mobile terminal apparatus including a voice communication function by radio communication.

In the mobile terminal apparatus 100 shown in FIG. 2, a main unit 101 and a display unit 102 are connected in a foldable manner. The main unit 101 includes an operation unit 101*a* accepting a user operation. The display unit 102 includes a display screen unit 102*a*. The operation unit 101*a* includes a direction input key 101*a*1 which accepts an eight-directional input operation by the user.

Figure 3:
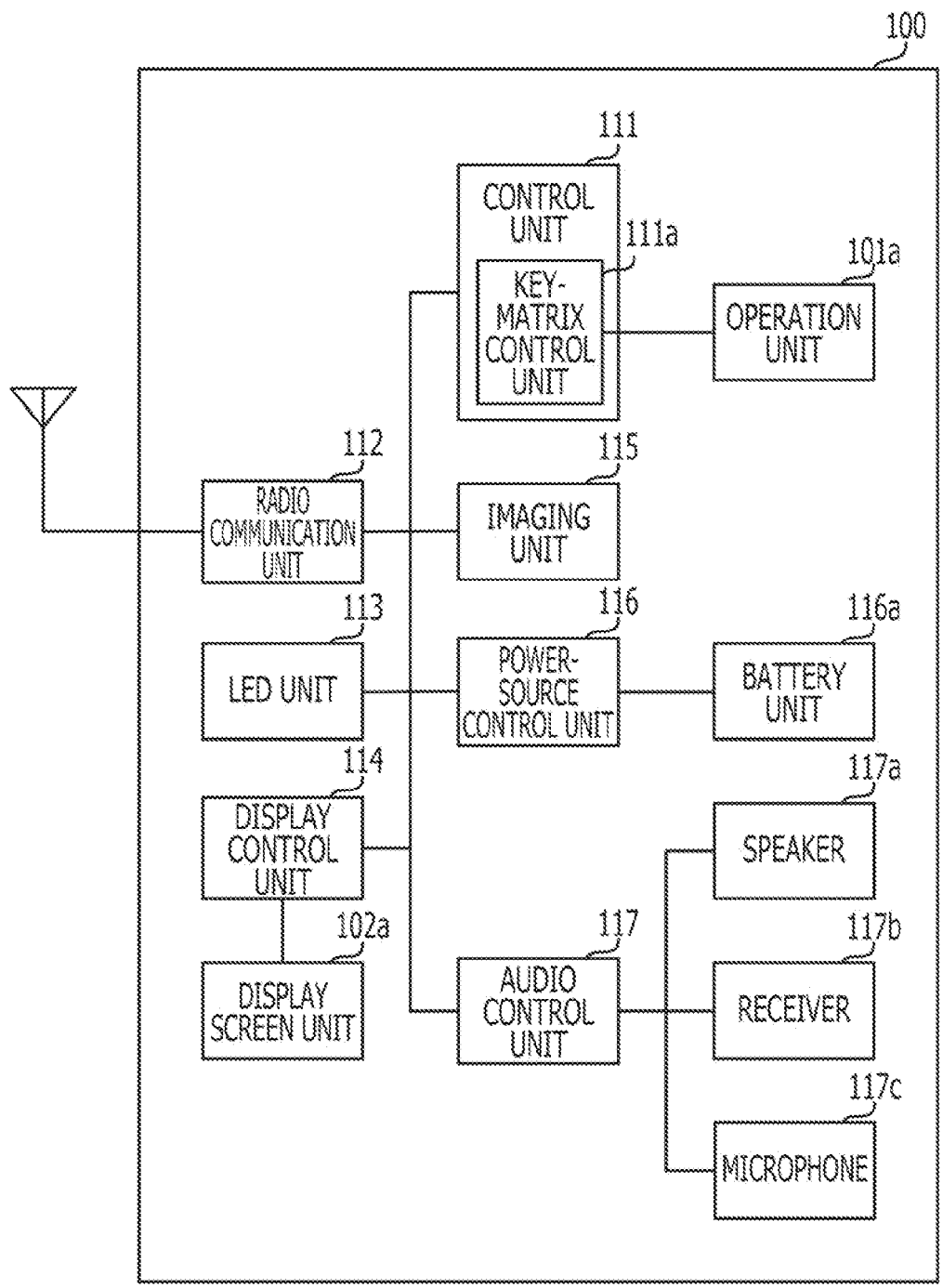
FIG. 3 is a block diagram illustrating hardware of the mobile terminal apparatus according to the second embodiment.

FIG. 3 is a block diagram illustrating hardware of the mobile terminal apparatus according to the second embodiment. The mobile terminal apparatus 100 according to the second embodiment includes an operation unit 101*a*, a display screen unit 102*a*, a control unit 111, a radio communication unit 112, an LED (Light Emitting Diode) unit 113, a display control unit 114, an imaging unit 115, a power control unit 116, a battery unit 116*a*, an audio control unit 117, a speaker 117*a*, a receiver 117*b*, and a microphone 117*c*. The control unit 111 includes a key-matrix control unit 111*a*.

The operation unit 101*a* includes an operation key, such as a direction input key 101*a*1, an input device, such as an operation button, a touch panel, and accepts an operation, such as an operation of an application, an operation of a cursor move, an input operation of numeric values and characters, turning power ON and OFF, and changing various modes, for example. A key operation of the operation unit 101*a* is detected by the key-matrix control unit 111*a* held by the control unit 111 scanning the key-matrix circuit.

The display screen unit 102*a* is a screen on which various kinds of information, such as images, characters, for example, is displayed to the user under the control of the display control unit 114. For the display screen unit 102*a*, a liquid crystal display (LCD), or an organic EL (Electro Luminescence) display may be used. Images displayed on the display screen unit 102*a* include, for example, a standby screen, operation screens, texts, and content images.

The control unit 111 controls the entire mobile terminal apparatus 100. The control unit 111 may be achieved by, for example, a CPU (Central Processing Unit), a RAM (Random Access Memory), and a ROM (Read Only Memory). The CPU reads programs and data from a ROM, and loads them into a RAM to perform the programs. The RAM is a volatile memory for storing at least part of the programs and the data temporarily. The other kinds of memory may be used in place of the RAM. The ROM is a non-volatile memory for storing programs and data used by the control unit 111. In place of the ROM, for example, a flash memory may be used. The control unit 111 performs various kinds of control including communication control, voice input/output control, key-operation control, for example. The control unit 111 includes various kinds of internal timers, such as a key-press monitor timer, for example.

The key-matrix control unit 111*a* controls detection of a user operation of the operation unit 101*a* using a key matrix circuit, e.g., such as a key matrix circuit, held by the operation unit 101*a*. A description will be given of the key matrix circuit with reference to FIG. 6.

The radio communication unit 112 performs radio communication with a public network under the control of the control unit 111. The radio communication unit 112 may directly communicate with a public network by mobile communication, for example, W-CDMA (Wideband Code Division Multiple Access) communication, and also communicate through a wireless LAN, such as IEEE 802.11a/b/g/n, for example.

The LED unit 113 includes an LED, and informs the user of a state of the mobile terminal apparatus 100 by the LED under the control of the control unit 111.

The display control unit 114 displays various images on the display screen unit 102*a* under the control of the control unit 111.

The imaging unit 115 includes a camera, and converts a still image or a moving image captured by the camera into image data. The power control unit 116 controls the battery unit 116*a* and an external power source to supply power to each unit of the mobile terminal apparatus 100. The power control unit 116 controls charging of the battery unit 116*a*.

The battery unit 116*a* includes a secondary battery capable of being repeatedly used as a battery by receiving power from the external power source connected to the mobile terminal apparatus 100 and storing electricity. The secondary battery supplies power to the mobile terminal apparatus 100. The secondary battery may be a storage battery. In the second embodiment, a lithium-ion battery is used for the battery. However, the battery is not limited to this, and any secondary battery may be used.

The audio control unit 117 controls an audio signal input to and output from the speaker 117a, the receiver 117b, and the microphone 117c in order to perform voice communication, for example.

The speaker 117a is a loud speaker that outputs sound in a state in which the mobile terminal apparatus 100 is apart from a user's ears. The receiver 117b is a telephone receiver that outputs sound in a state in which the mobile terminal apparatus 100 touches a user's ear. It is possible for the user to changeably use the speaker 117a and the receiver 117b in accordance with a state and preference at the time of using the mobile terminal apparatus 100. The speaker 117a and the receiver 117b converts an electronic signal into physical vibration to play back sound under the control of the audio control unit 117. For example, when the user is talking on the telephone, voice and background noise of the other end of the line is output from the speaker 117a or the receiver 117b.

The microphone 117c receives sound input by converting physical vibration of sound into an electronic signal, and outputs it to the audio control unit 117. For example, when the user is talking on a phone, voice of the user and background noise of the user is input from the microphone 117c.

Figure 4:
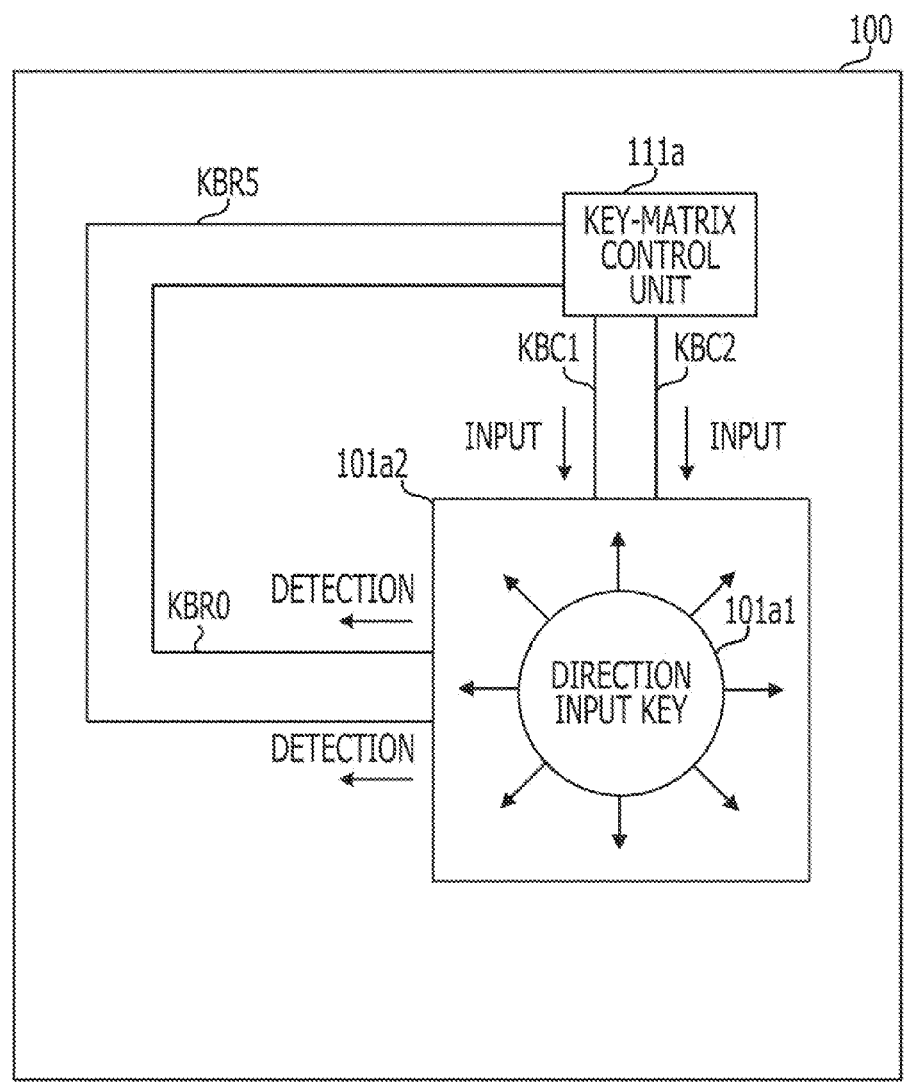
FIG. 4 is a block diagram illustrating functions of the mobile terminal apparatus according to the second embodiment.

FIG. 4 is a block diagram illustrating functions of the mobile terminal apparatus according to the second embodiment.

The mobile terminal apparatus 100 includes a key matrix circuit 101a2, a direction input key 101a1, a key-matrix control unit 111a, and signal lines KBC1, KBC2, KBR0, and KBR5. The mobile terminal apparatus 100 detects a user's direction input operation by a plurality of contact points that are capable of changing the signal lines KBC1, KBC2, KBR0, and KBR5 from an electrically connected state to a disconnected state or vice versa, with each other.

The key matrix circuit 101a2 includes a plurality of contact points as described below in FIG. 6. The contact points of the key matrix circuit 101a2 are related to the user's direction input operations, respectively. When the user performs an input operation in a predetermined direction on the direction input key 101a1, the corresponding contact point is changed into a connected state on the basis of the user's direction input operation caused by pressing the direction input key 101a1. When the direction input operation is complete, such as the completion of the pressing of the direction input key 101a1, for example, the contact point having been in a connected state by the direction input operation is changed into an open state. The key matrix circuit 101a2 functions as a detection circuit.

The direction input key 101a1 accepts a user's direction input operation in one of the eight directions and the other input operations, and changes a state of the contact points held by the key matrix circuit 101a2 on the basis of the accepted input operation between a connected state and an open state. Thereby, the user's direction input operation accepted by the direction input key 101a1 is reflected on the states of the contact points of the key matrix circuit 101a2. The direction input key 101a1 functions as the input key unit.

The direction input key 101a1 is capable of accepting a user's direction input operation in a diagonal direction, and when a direction input operation in a diagonal direction is accepted, a contact point is changed into a connected state. The diagonal direction indicates a direction that is inclined to perpendicular directions, "up", "down", "left", and "right" by 45 degrees. Specifically, it is assumed that the diagonal directions are "upper right", "lower right", "lower left", and "upper left". That is to say, in the second embodiment, it is possible to accept direction input operations in eight directions in total, namely, up, down, right, left, and the diagonal directions. However, a direction input operation is not limited to this, and direction input operations in more than eight directions, such as 16 directions, for example, may be accepted. For example, direction input operations in less than eight directions, such as 5 directions, namely, "left", "upper left", "up", "upper right", and "right", which are part of the eight directions may be accepted.

The key-matrix control unit 111a provides an input signal to the key matrix circuit 101a2 through the signal lines KBC1 and KBC2, and obtains detection signals output from the signal lines KBR0 and KBR5 of the key matrix circuit 101a2. The key-matrix control unit 111a detects eight direction input operations in the perpendicular directions and the diagonal directions and the other input operations from the obtained detection signals. The key-matrix control unit 111a functions as the detection-circuit control unit.

In the second embodiment, a description has been given of the case where the key-matrix control unit 111a provides input signals to the key matrix circuit 101a2 through the signal lines KBC1 and KBC2, the detection signals are output from the signal lines KBR0 and KBR5, and the key-matrix control unit 111a detects the detection signals so that the user's direction input operation is detected. However, a method of detection is not limited to this. The key-matrix control unit 111a may provide input signals to the key matrix circuit 101a2 through the signal lines KBR0 and KBR5, detection signals may be output from the signal lines KBC1 and KBC2, and the key-matrix control unit 111a may detect the detection signals so that the user's direction input operation may be detected.

Figure 5:
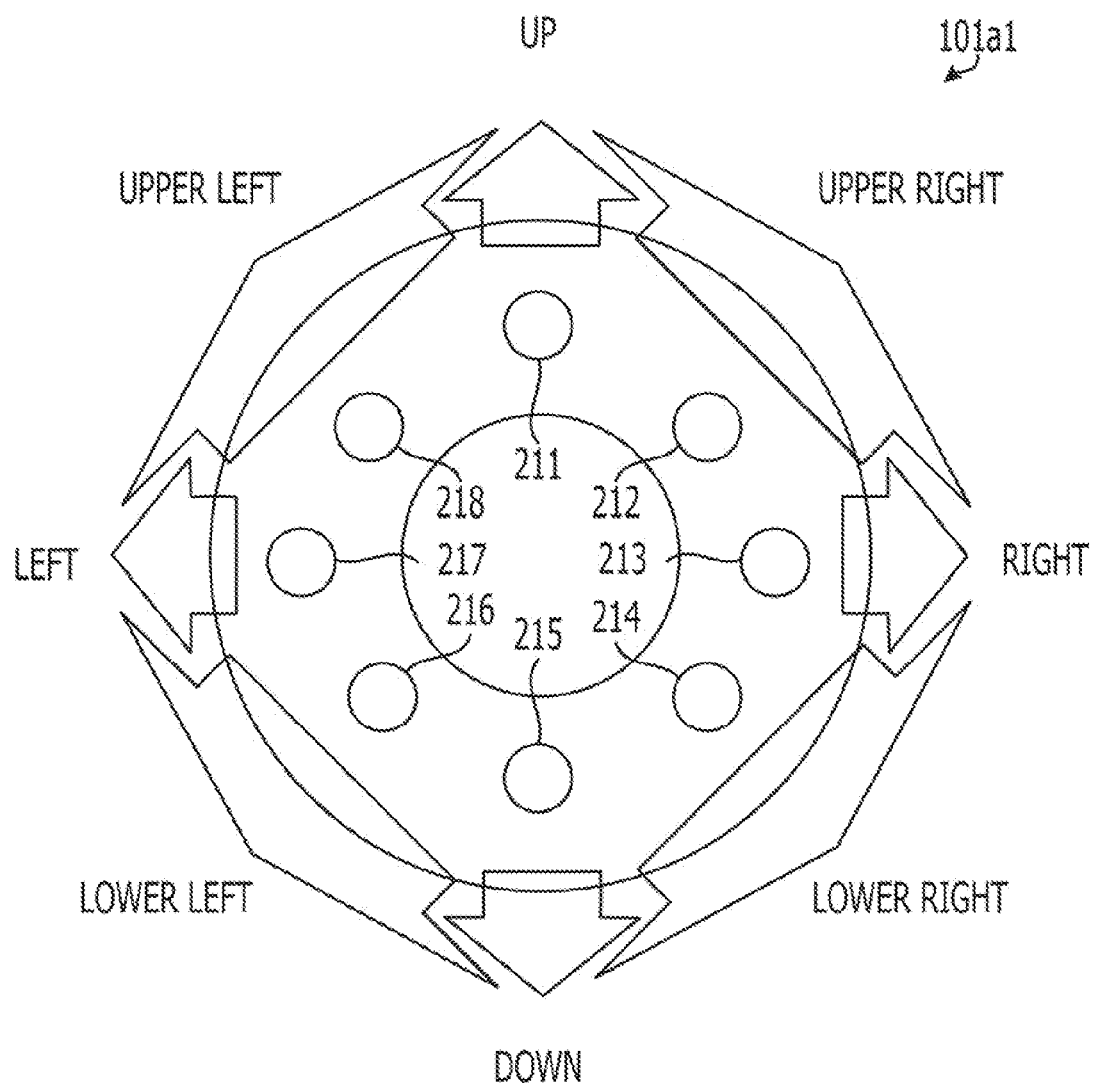
FIG. 5 is a diagram illustrating a direction input key according to the second embodiment.

FIG. 5 is a diagram illustrating a direction input key according to the second embodiment. The direction input key 101a1 accepts a user's input operation in one of the eight directions together with the key matrix circuit 101a2 in FIG. 6.

The direction input key 101a1 is provided with contact points 211, 212, 213, 214, 215, 216, 217, and 218. The contact points 211, 212, 213, 214, 215, 216, 217, and 218 make an electrical connection on the basis of an input operation by the user in the up direction, the upper right direction, the right direction, the lower right direction, the down direction, the lower left direction, the left direction, and the upper left direction, respectively. The contact points 211 to 218 are disposed on the key matrix circuit 101a2. The contact points 211 to 218 are connected to the key-matrix control unit 111a held by the control unit 111 through the signal lines. The detection signals based on the connection and the open of the contact points 211 to 218 are output from the key matrix circuit 101a2, and the output detection signals are detected by the key-matrix control unit 111a. The key-matrix control unit 111a accepts a user's direction input operation on the basis of the detection signal output from the key matrix circuit 101a2.

When a user who operates the mobile terminal apparatus 100 performs an input operation in the up direction by the direction input key 101a1, for example, the user presses the direction input key 101a1 so as to incline the direction input key 101a1 in the up direction. Thereby, the contact point 211 of the direction input key 101a1 is electrically connected.

As described later in FIG. 6, in the second embodiment, there may be cases where a user makes a mistake in an input operation when the user attempts to perform a diagonal-direction input operation. Even in such cases, it is possible to detect that the user's input operation is the diagonal-direction input operation. For example, there are cases where a connection is made on one or two contact points out of the contact points adjacent on both sides of the diagonal-direction contact point, namely, in up, down, right, and left directions. Also there are cases where a connection is made on only the two adjacent contact points, and not on the intended diagonal-direction contact point. For example, it is assumed that the user has operated to make connections on the contact point 211 accepting the up direction input operation, which is adjacent on the up side to the contact point 212 accepting the upper-right direction input operation, and the contact point 213 accepting the right direction input operation, which is adjacent on the right side to the contact point 212. In this case, it is also possible to detect that the upper-right input operation has been performed by the key matrix circuit 101a2. In the same manner, it is also possible to detect that the upper-right direction input operation is performed in the case where either one of the contact points 211 and 213 and the contact point 212 are connected, or the case where only the contact point 211 and the contact point 213 are connected.

Figure 6:
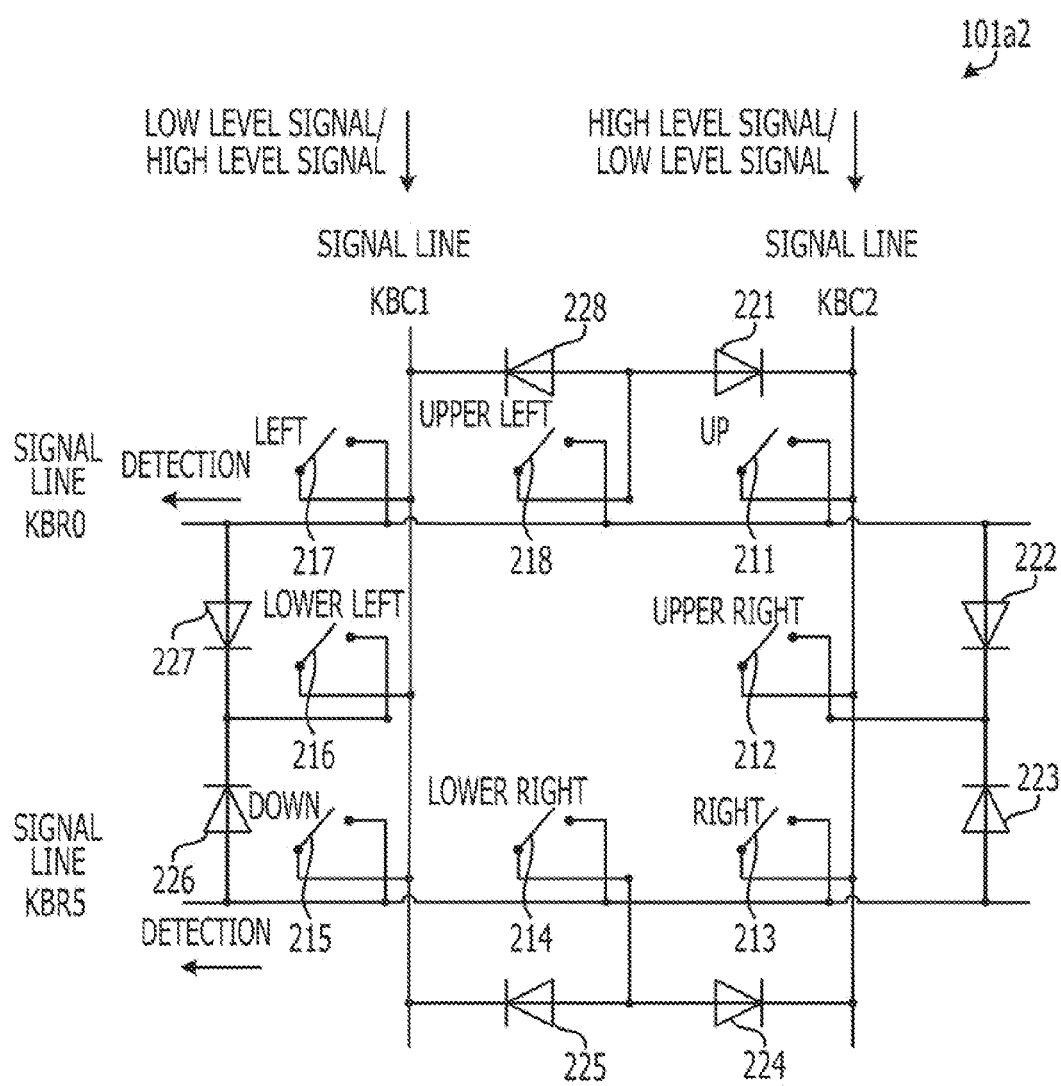
FIG. 6 is a diagram illustrating a key matrix circuit according to the second embodiment.

FIG. 6 is a diagram illustrating a key matrix circuit according to the second embodiment. The operation unit 101a according to the second embodiment includes the key matrix circuit 101a2 shown in FIG. 6 concerning detection of a direction input operation. The key matrix circuit 101a2 includes contact points 211, 212, 213, 214, 215, 216, 217, and 218, and diodes 221, 222, 223, 224, 225, 226, 227, and 228, and signal lines KBC1, KBC2, KBR0, and KBR5.

The key matrix circuit 101a2 is connected to the key-matrix control unit 111a held by the control unit 111 through the signal lines KBC1, KBC2, KBR0, and KBR5. For key-scanning by the key matrix circuit 101a2, the key-matrix control unit 111a provides input of a high-level signal (High) or a low-level signal (Low) to the key matrix circuit 101a2 from the signal lines KBC1 and KBC2. And the key-matrix control unit 111a detects either the high-level signal or the low-level signal from the signal lines KBR0 and KBR5 at this time. And a user's direction input operation is detected by the combination of the signals detected from the signal lines KBR0 and KBR5.

The contact points 211 to 218 are capable of changing between a connected state in which each signal line is electrically connected and an open state in which each signal line is not electrically connected in accordance with the user's operation on the direction input key 101a1.

Specifically, the contact point 211 is capable of changing between a connected state in which the signal line KBR0 and the signal line KBR5 are electrically connected, and an open state in which the signal line KBR0 and the signal line KBR5 are electrically not connected. The contact point 212 is capable of changing between a connected state in which the signal line KBR0 and the signal line KBR5 are electrically connected and the signal line KBR5 and the signal line KBC2 are electrically connected, and an open state in which the signal line KBR0 and the signal line KBR5 are electrically not connected and the signal line KBR5 and the signal line KBC2 are electrically not connected.

The contact point 213 is capable of changing between a connected state in which the signal line KBR5 and the signal line KBC2 are electrically connected, and an open state in which the signal line KBR5 and the signal line KBC2 are electrically not connected. The contact point 214 is capable of changing between a connected state in which the signal line KBR5 and the signal line KBC2 are electrically connected and the signal line KBC2 and the signal line KBC1 are electrically connected, and an open state in which the signal line KBR5 and the signal line KBC2 are electrically not connected and the signal line KBC2 and the signal line KBC1 are electrically not connected.

The contact point 215 is capable of changing between a connected state in which the signal line KBC2 and the signal line KBC1 are electrically connected, and an open state in which the signal line KBC2 and the signal line KBC1 are electrically not connected. The contact point 216 is capable of changing between a connected state in which the signal line KBR0 and the signal line KBC1 are electrically connected and the signal line KBC2 and the signal line KBC1 are electrically connected, and an open state in which the signal line KBR0 and the signal line KBC1 are electrically not connected and the signal line KBC2 and the signal line KBC1 are electrically not connected.

The contact point 217 is capable of changing between a connected state in which the signal line KBR0 and the signal line KBC1 are electrically connected, and an open state in which the signal line KBR0 and the signal line KBC1 are electrically not connected. The contact point 218 is capable of changing between a connected state in which the signal line KBR0 and the signal line KBR5 are electrically connected and the signal line KBR0 and the signal line KBC1 are electrically connected, and an open state in which the signal line KBR0 and the signal line KBR5 are electrically not connected and the signal line KBR0 and the signal line KBC1 are electrically not connected.

The diodes 221 to 228 prevent a short circuit between the signal lines KBC1 and KBC2, and the signal lines KBR0 and the signal line KBR5. Accordingly, erroneous recognition that a contact point other than connected contact points is connected is substantially prevented.

In the key matrix circuit 101a2 according to the second embodiment, the contact points 211, 213, 215, and 217 corresponding to "up", "right", "down", and "left", respectively, out of the user's direction input operations are disposed so as to be connected to either one of the signal lines KBR0 and KBR5, and either one of the signal lines KBC1 and KBC2. The contact points 212, 214, 216, and 218 corresponding to diagonal directions of "upper right", "lower right", "lower left", and "upper left", respectively, out of the use's direction input operations are disposed between the adjacent directions out of "up", "right", "down", and "left", and distribute the signal lines KBR0 and KBR5, or distribute the signal lines KBC1 and KBC2.

In the second embodiment, it is not necessary to newly add a matrix circuit and the other signal lines in order to accept a diagonal-direction input operation. Also, it is not necessary to newly dispose an interrupt, for example, in order to accept a diagonal-direction input operation. In the second embodiment, it is possible to accept a direction input operation in eight directions using only two signal lines without complicating the signal processing.

In the second embodiment, substantially the same detection result is obtained in the case of a connection on a contact point accepting a diagonal-direction input operation, in the case of connections on that contact point and either one of the contact points adjacent to that contact point, and in the case of connections of three contact points including that contact point and the two contact points adjacent thereto.

For example, in the second embodiment, it is possible to detect the upper-right direction input operation by a connection of the contact point 212 that accepts the upper-right direction input operation. In the second embodiment, it is also possible to detect the upper-right direction input operation by two connections in total of the contact point 212 and the contact point 211 that is adjacent on the up side to the contact point 212 and accepting the up-direction input operation. In the second embodiment, it is also possible to detect the upper-right direction input operation by two connections in total of the contact point 212 and the contact point 213 that is adjacent on the right side to the contact point 212 accepting the right-direction input operation. In the second embodiment, it is also possible to detect the upper-right direction input operation by three connections of the contact points 211 to 213.

In any one of these cases, in response to an input of a low-level signal to the signal line KBC1, a high-level signal is detected on both of the signal lines KBR0 and KBR5, and in response to an input of a low-level signal to the signal line to the signal line KBC2, a low-level signal is detected on both of the signal lines KBR0 and KBR5. It is also possible to detect an upper-right direction input by the key matrix circuit 101a2 in the case where only a connection is made on the contact point 212, and in the case where connections are made on the contact points 211 and 213. It is also possible to detect an upper-right direction input by the key matrix circuit 101a2 in the case where connections are made on the contact point 212 and either one of the contact points 211 and 213, and in the case where connections are made on the contact points 211, 212, and 213.

The key matrix circuit 101a2 according to the second embodiment is part of the key matrix circuit held by the mobile terminal apparatus 100, and illustrates a circuit detecting a user's direction input operation by the direction input key 101a1.

In the second embodiment, each of the contact points corresponding to "up", "right", "down", and "left" is connected to either one of the signal lines KBR0 and KBR5, and is connected to either one of the signal lines KBC1 and KBC2, and the contact points corresponding to "upper right", "lower right", "lower left", "upper left" distribute the signal lines KBR0 and KBR5, or distribute the signal lines KBC1 and KBC2. However, each of the contact points corresponding to "upper right", "lower right", "lower left", and "upper left" is connected to either one of the signal lines KBR0 and KBR5, and is connected to either one of the signal lines KBC1 and KBC2, and the contact points corresponding to "up", "right", "down", and "left" distribute the signal lines KBR0 and KBR5, or distribute the signal lines KBC1 and KBC2.

The key matrix circuit 101a2 and the signals that are input to and output from the key matrix circuit 101a2 are not limited to the circuit and the signals shown in FIG. 6, and different circuits and signals having substantially the same functions may be used.

In the second embodiment, the key matrix circuit 101a2 has eight contact points. However, the number of contact points may be seven or less, or may be nine or greater. The key matrix circuit 101a2 has four signal lines. However, the number of signal lines may be three or less, or may be five or greater.

FIG. 7 is a diagram illustrating relationships between the direction input operations according to the second embodiment and the detection signals of the key matrix circuit. As shown in FIG. 7, in the second embodiment, a direction input by a user's direction input operation is detected by the combination of the input signals from the signal lines KBC1 and KBC2 to the key matrix circuit 101a2, and detection signals detected from the signal lines KBR0 and KBR5 when the input signals are input into the key matrix circuit 101a2.

The "detection timing" in FIG. 7 shows a point in time of detecting a direction input operation by the input signals and the detection signals. Although a detailed description will be given later from FIG. 8 to FIG. 11, in the mobile terminal apparatus 100 according to the second embodiment, detection is performed on the key matrix circuit 101a2 in the order of "T1"→"T2"→"T3"→"T4". The order of detection timing may be set to any order.

The "input signal" shows an input signal from either one of the signal lines KBC1 and KBC2 to the key matrix circuit 101a2 at detection timing. The "detection signal" shows a signal output from the key matrix circuit 101a2 to either one of the signal lines KBR0 and KBR5 at detection timing. In the key matrix circuit 101a2 according to the second embodiment, a low-level signal is handled as "ON" for the input signal and the detection signal. However, a high-level signal may be set to be handled as ON for both of or either one of the input signals and the output signals.

For example, at detection timing T1, for each direction input operation, when a low-level signal is input from the signal line KBC1, whether a low-level signal is detected or not is shown on the signal line KBR0.

The "direction input operation" shows a direction input by a user's direction input operation using the direction input key 101a1. If a detection result of the user's input direction at each detection timing is the low-level signal, "1" is entered. If the detection result is the high-level signal, "0" is entered. For example, if the user input in the up direction by the direction input key 101a1, as shown in FIG. 7, the detection signal at detection timing T1 is the high-level signal, the detection signal at detection timing T2 is the high-level signal, the detection signal at detection timing T3 is the low-level signal, and the detection signal at detection timing T4 is the high-level signal. Each detection result may be uniquely identified, and thus it is possible to detect the input operation by the user's direction input operation using the key matrix circuit 101a2.

In the second embodiment, when the user performs a diagonal-direction input operation, the same detection result is obtained in all the cases of a connection on a contact point accepting a diagonal-direction input operation, connections on the contact points adjacent to that contact point accepting the diagonal-direction input operation, and further connections of three contact points including the contact point accepting the diagonal-direction input operation and the two contact points adjacent thereto.

In FIG. 7, for example, when the user performs a direction input operation in the upper right, a low-level signal of the detection signal is detected at detection timing T3 and T4, and a high-level signal thereof is detected at detection timing T1 and T2. When the user performs a direction input operation in the up direction, a low-level signal of the detection signal is detected at detection timing T3, and a high-level signal thereof is detected at detection timing T1, T2, and T4. When the user performs a direction input operation in the right direction, a low-level signal of the detection signal is detected at detection timing T4, a high-level signal thereof is detected at detection timing detection timing T1, T2, and T3.

In FIG. 7, the detection result in the case of performing the upper-right direction input operation is a logical add of the detection result in the case of performing the up-direction input operation and the detection result in the case of performing the right-direction input operation. The same detection result is obtained in all the cases where, by the user's direction input operation, a connection is made on the contact point 212 (upper right), connections are made on the contact point 211 (up) and the contact point 213 (right), and connections are made on the contact points 211 to 213. In the key matrix circuit 101a2 according to the second embodiment, when the user performs a diagonal-direction input operation, it becomes also possible to accept a diagonal-direction input operation in any one of the cases where connections are made on only the contact point adjacent on the both sides, and further, connections are made on both a diagonal-direction contact point and the contact point adjacent on the both sides. Accordingly, it becomes possible to improve the operationality of the user's diagonal-direction input operation.

FIG. 8 to FIG. 11 are timing charts illustrating key scan at the time of pressing a direction input key according to the second embodiment. The timing charts shown from FIG. 8 to FIG. 11 illustrate states of scanning of the key matrix circuit 101a2 when the user performs a direction input operation using the direction input key 101a1 in the mobile terminal apparatus 100.

Figure 8:
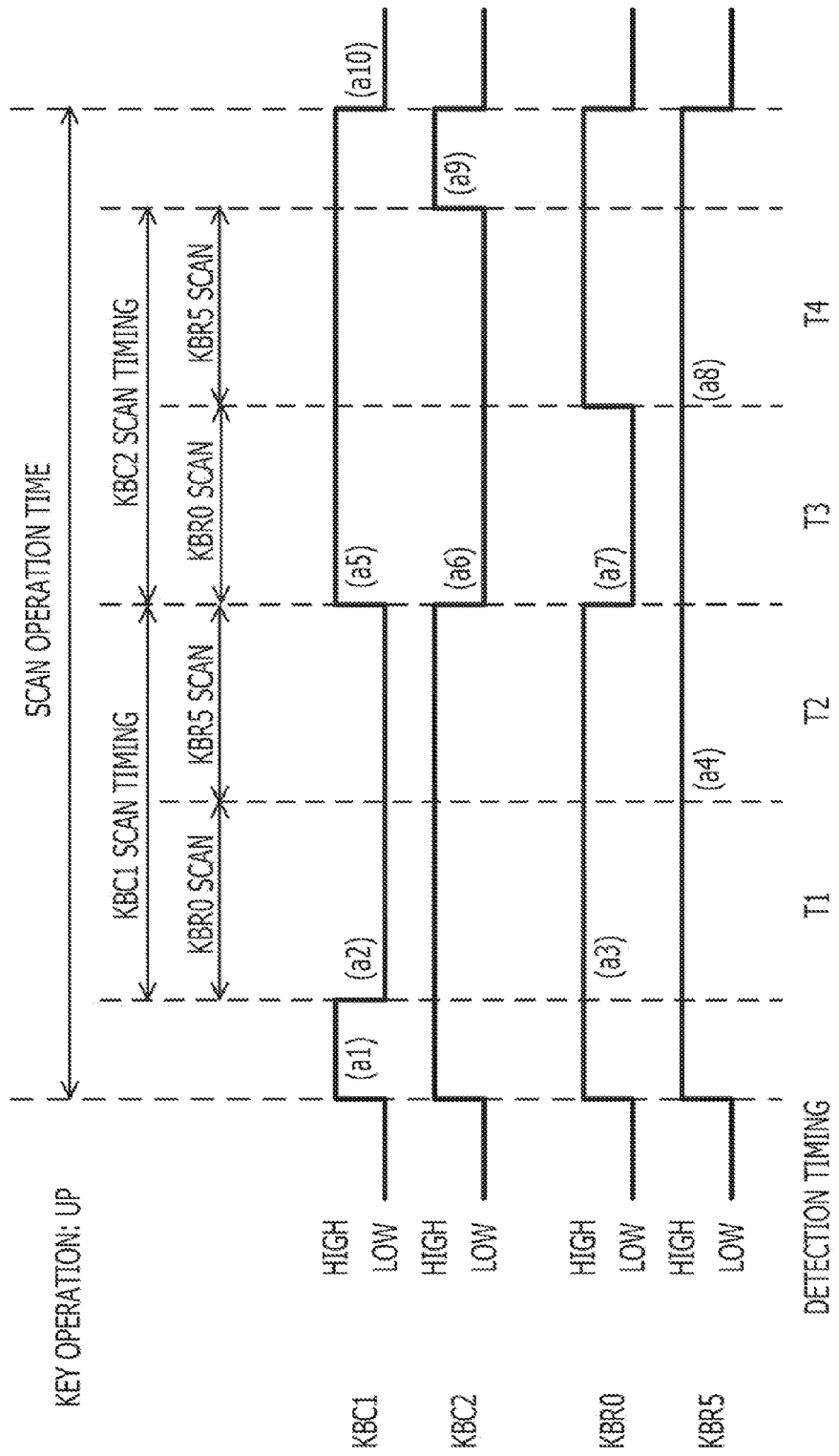
FIG. 8 is timing charts illustrating key scan at the time of pressing a direction input key according to the second embodiment.

FIG. 8 illustrates the case where the user presses the direction input key 101a1 in the up direction so as to perform the up-direction input operation. FIG. 8 illustrates an example of detection signals detected on the signal line KBR0 and the signal line KBR5 when a low-level signal is input on the signal line KBC1, and after that, a low-level signal is input on the signal line KBC2. A description will be given of the detection signal when the user presses the direction input key 101a1 in the up direction so that a connection is made on the contact point 211 of the key matrix circuit 101a2 in accordance with FIG. 8.

At the start of key scan by the key matrix circuit 101a2, the key-matrix control unit 111a outputs a high-level signal on the signal lines KBC1 and KBC2 ((a1) in FIG. 8). A high-level signal is input from the signal lines KBC1 and KBC2 to the key matrix circuit 101a2.

At detection timing T1, the key-matrix control unit 111a changes the high-level signal having been output on the signal line KBC1 to the low-level signal ((a2) in FIG. 8). Thereby, the low-level signal is input from the signal line KBC1 to the key matrix circuit 101a2, and the high-level signal is input from the signal line KBC2 to the key matrix circuit 101a2. The key-matrix control unit 111a detects the high-level signal from the signal line KBR0 ((a3) in FIG. 8).

At detection timing T2, the key-matrix control unit 111a detects the high-level signal output from the signal line KBR5 ((a4) in FIG. 8).

At detection timing T3, the key-matrix control unit 111a changes the low-level signal having been output to the signal line KBC1 to the high-level signal ((a5) in FIG. 8), and changes the high-level signal having been output to the signal line KBC2 to the low-level signal ((a6) in FIG. 8). Thereby, the high-level signal is input from the signal line KBC1 to the key matrix circuit 101a2, and the low-level signal is input from the signal line KBC2 to the key matrix circuit 101a2. The key-matrix control unit 111a detects the low-level signal output from the signal line KBR0 ((a7) in FIG. 8).

At detection timing T4, the key-matrix control unit 111a detects the high-level signal output from the signal line KBR5 ((a8) in FIG. 8).

The key-matrix control unit 111a changes the low-level signal having been output from the signal line KBC2 to the high-level signal ((a9) in FIG. 8). After the key-matrix control unit 111a changes the high-level signal having been output from the signal lines KBC1 and KBC2 to the low-level signal, the key-matrix control unit 111a terminates key scan ((a10) in FIG. 8).

Figure 9:
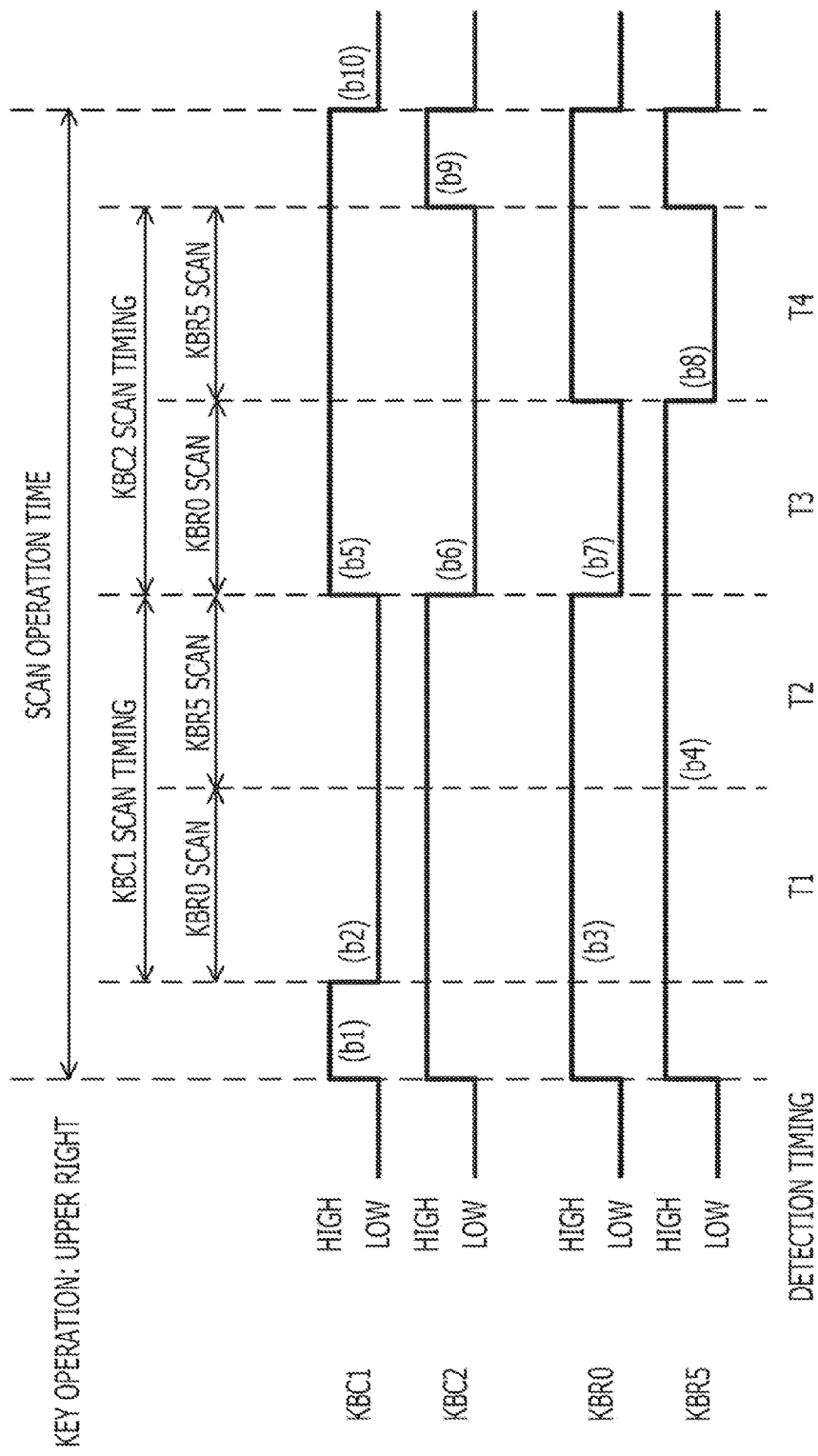
FIG. 9 is timing charts illustrating key scan at the time of pressing a direction input key according to the second embodiment.

FIG. 9 illustrates the case where the user presses the direction input key 101a1 in the upper-right direction so as to perform the upper-right direction input operation. FIG. 9 illustrates an example of detection signals detected on the signal line KBR0 and the signal line KBR5 when a low-level signal is input on the signal line KBC1, and after that, a low-level signal is input on the signal line KBC2. A description will be given of the detection signal when the user presses the direction input key 101a1 in the upper-right so that a connection is made on the contact point 212 of the key matrix circuit 101a2 in accordance with FIG. 9.

At the time of starting key scan by the key matrix circuit 101a2, the key-matrix control unit 111a outputs the high-level signal to the signal lines KBC1 and KBC2 ((b1) in FIG. 9). Thereby, the high-level signal is input from the signal lines KBC1 and KBC2 to the key matrix circuit 101a2.

At detection timing T1, the key-matrix control unit 111a changes the high-level signal having been output to the signal line KBC1 to the low-level signal ((b2) in FIG. 9). Thereby, the low-level signal is input from the signal line KBC1 to the key matrix circuit 101a2, and the high-level signal is input from the signal line KBC2 to the key matrix circuit 101a2. The key-matrix control unit 111a detects the high-level signal output from the signal line KBR0 ((b3) in FIG. 9).

At detection timing T2, the key-matrix control unit 111a detects the high-level signal output from the signal line KBR5 ((b4) in FIG. 9).

At detection timing T3, the key-matrix control unit 111a changes the low-level signal having been output to the signal line KBC1 to the high-level ((b5) in FIG. 9), and changes the high-level signal having been output to the signal line KBC2 to the low-level signal ((b6) in FIG. 9). Thereby, the high-level signal is input from the signal line KBC1 to the key matrix circuit 101a2, and the low-level signal is input from the signal line KBC2 to the key matrix circuit 101a2. The key-matrix control unit 111a detects the low-level signal output from the signal line KBR0 ((b7) in FIG. 9).

At detection timing T4, the key-matrix control unit 111a detects the low-level signal output from the signal line KBR5 ((b8) in FIG. 9).

The key-matrix control unit 111a changes the low-level signal having been output from the signal line KBC2 to the high-level signal ((b9) in FIG. 9). The key-matrix control unit 111a changes the high-level signal having been output from the signal lines KBC1 and KBC2 to the low-level signal, and terminates key scan ((b10) in FIG. 9).

Figure 10:
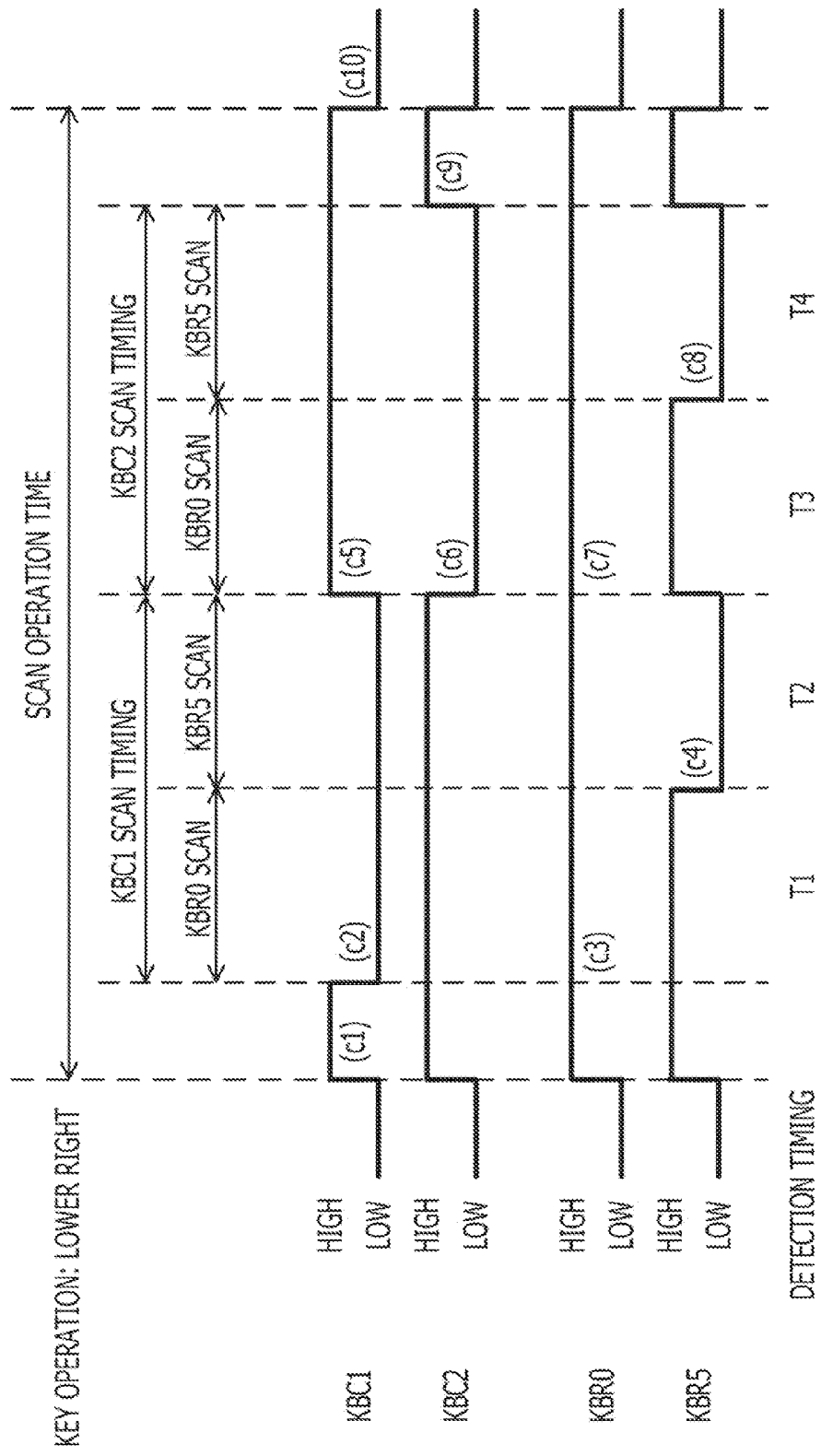
FIG. 10 is timing charts illustrating key scan at the time of pressing a direction input key according to the second embodiment.

FIG. 10 illustrates the case where the user presses the direction input key 101a1 in the lower-right direction so as to perform the lower-right direction input operation. FIG. 10 illustrates an example of detection signals detected on the signal line KBR0 and the signal line KBR5 when a low-level signal is input on the signal line KBC1, and after that, a low-level signal is input on the signal line KBC2. A description will be given of the detection signal when the user presses the direction input key 101a1 in the lower-right so that a connection is made on the contact point 214 of the key matrix circuit 101a2 in accordance with FIG. 10.

At the time of starting key scan by the key matrix circuit 101a2, the key-matrix control unit 111a outputs the high-level signal to the signal lines KBC1 and KBC2 ((c1) in FIG. 10). Thereby, the high-level signal is input from the signal lines KBC1 and KBC2 to the key matrix circuit 101a2.

At detection timing T1, the key-matrix control unit 111a changes the high-level signal having been output to the signal line KBC1 to the low-level signal ((c2) in FIG. 10). Thereby, the low-level signal is input from the signal line KBC1 to the key matrix circuit 101a2, and the high-level signal is input from the signal line KBC2 to the key matrix circuit 101a2. The key-matrix control unit 111a detects the high-level signal output from the signal line KBR0 ((c3) in FIG. 10).

At detection timing T2, the key-matrix control unit 111a detects the high-level signal output from the signal line KBR5 ((c4) in FIG. 10).

At detection timing T3, the key-matrix control unit 111a changes the low-level signal having been output to the signal line KBC1 to the high-level ((c5) in FIG. 10), and changes the high-level signal having been output to the signal line KBC2 to the low-level signal ((c6) in FIG. 10). Thereby, the high-level signal is input from the signal line KBC1 to the key matrix circuit 101a2, and the low-level signal is input from the signal line KBC2 to the key matrix circuit 101a2. The key-matrix control unit 111a detects the low-level signal output from the signal line KBR0 ((c7) in FIG. 10).

At detection timing T4, the key-matrix control unit 111a detects the low-level signal output from the signal line KBR5 ((c8) in FIG. 10).

The key-matrix control unit 111a changes the low-level signal having been output from the signal line KBC2 to the high-level signal ((c9) in FIG. 10). The key-matrix control unit 111a changes the high-level signal having been output from the signal lines KBC1 and KBC2 to the low-level signal, and terminates key scan ((c10) in FIG. 10).

Figure 11:
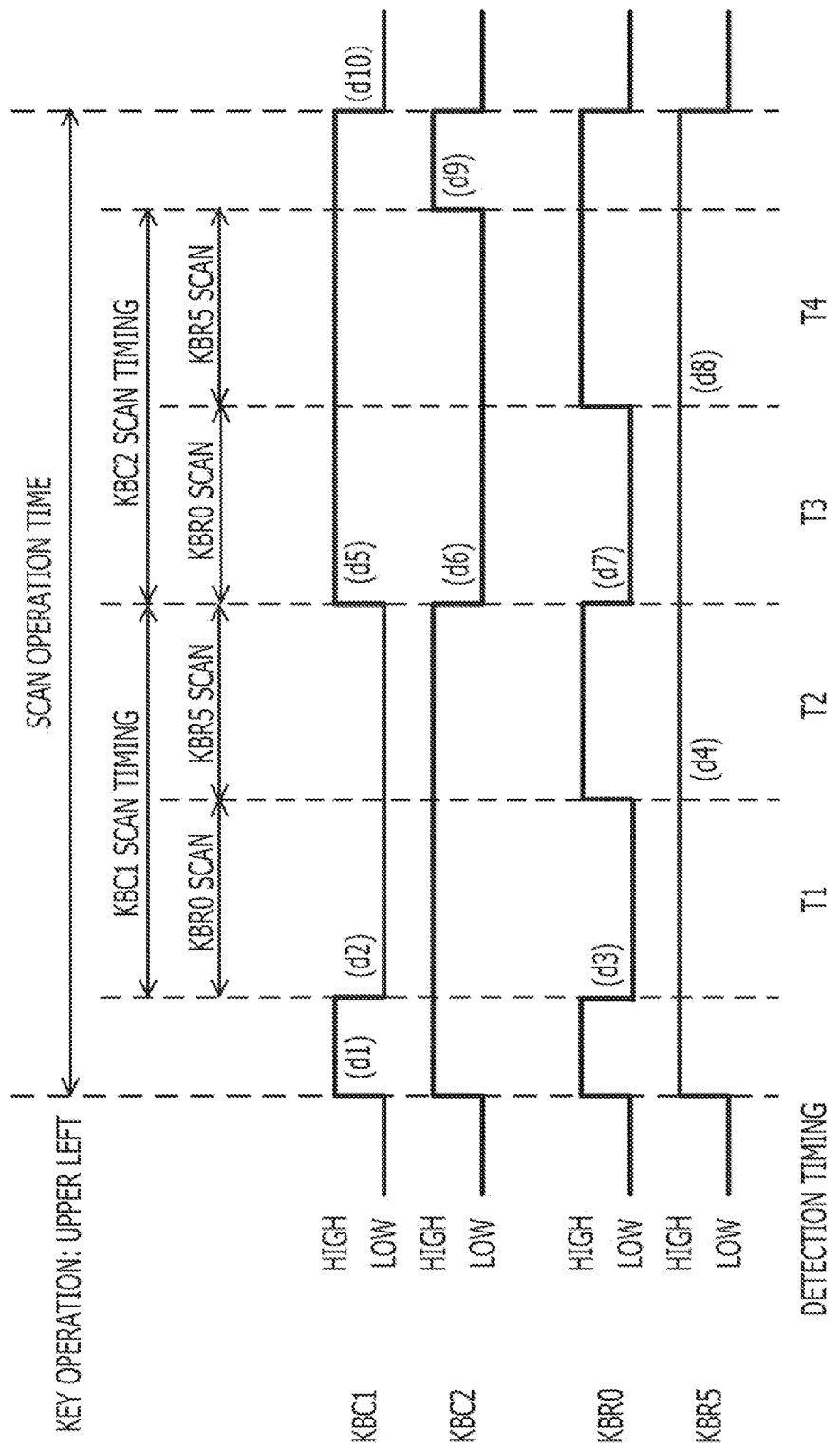
FIG. 11 is timing charts illustrating key scan at the time of pressing a direction input key according to the second embodiment.

FIG. 11 illustrates the case where the user presses the direction input key 101a1 in the upper-left direction so as to perform the upper-left direction input operation. FIG. 11 illustrates an example of detection signals detected on the signal line KBR0 and the signal line KBR5 when a low-level signal is input on the signal line KBC1, and after that, a low-level signal is input on the signal line KBC2. A description will be given of the detection signal when the user presses the direction input key 101a1 in the upper-left so that a connection is made on the contact point 218 of the key matrix circuit 101a2 in accordance with FIG. 11.

At the time of starting key scan by the key matrix circuit 101a2, the key-matrix control unit 111a outputs the high-level signal to the signal lines KBC1 and KBC2 ((d1) in FIG. 11). Thereby, the high-level signal is input from the signal lines KBC1 and KBC2 to the key matrix circuit 101a2.

At detection timing T1, the key-matrix control unit 111a changes the high-level signal having been output to the signal line KBC1 to the low-level signal ((d2) in FIG. 11). Thereby, the low-level signal is input from the signal line KBC1 to the key matrix circuit 101a2, and the high-level signal is input from the signal line KBC2 to the key matrix circuit 101a2. The key-matrix control unit 111a detects the high-level signal output from the signal line KBR0 ((d3) in FIG. 11).

At detection timing T2, the key-matrix control unit 111a detects the high-level signal output from the signal line KBR5 ((d4) in FIG. 11).

At detection timing T3, the key-matrix control unit 111a changes the low-level signal having been output to the signal line KBC1 to the high-level ((d5) in FIG. 11), and changes the high-level signal having been output to the signal line KBC2 to the low-level signal ((d6) in FIG. 11). Thereby, the high-level signal is input from the signal line KBC1 to the key matrix circuit 101a2, and the low-level signal is input from the signal line KBC2 to the key matrix circuit 101a2. The key-matrix control unit 111a detects the low-level signal output from the signal line KBR0 ((d7) in FIG. 11).

At detection timing T4, the key-matrix control unit 111a detects the low-level signal output from the signal line KBR5 ((d8) in FIG. 11).

The key-matrix control unit 111a changes the low-level signal having been output from the signal line KBC2 to the high-level signal ((d9) in FIG. 11). The key-matrix control unit 111a changes the high-level signal having been output from the signal lines KBC1 and KBC2 to the low-level signal, and terminates key scan ((d10) in FIG. 11).

In the second embodiment, when the user presses the direction input key 101a1 in the right direction, the down direction, the lower left direction, and the left direction, key scan is performed in substantially the same manner as described above. The descriptions thereof will be omitted.

Figure 12:
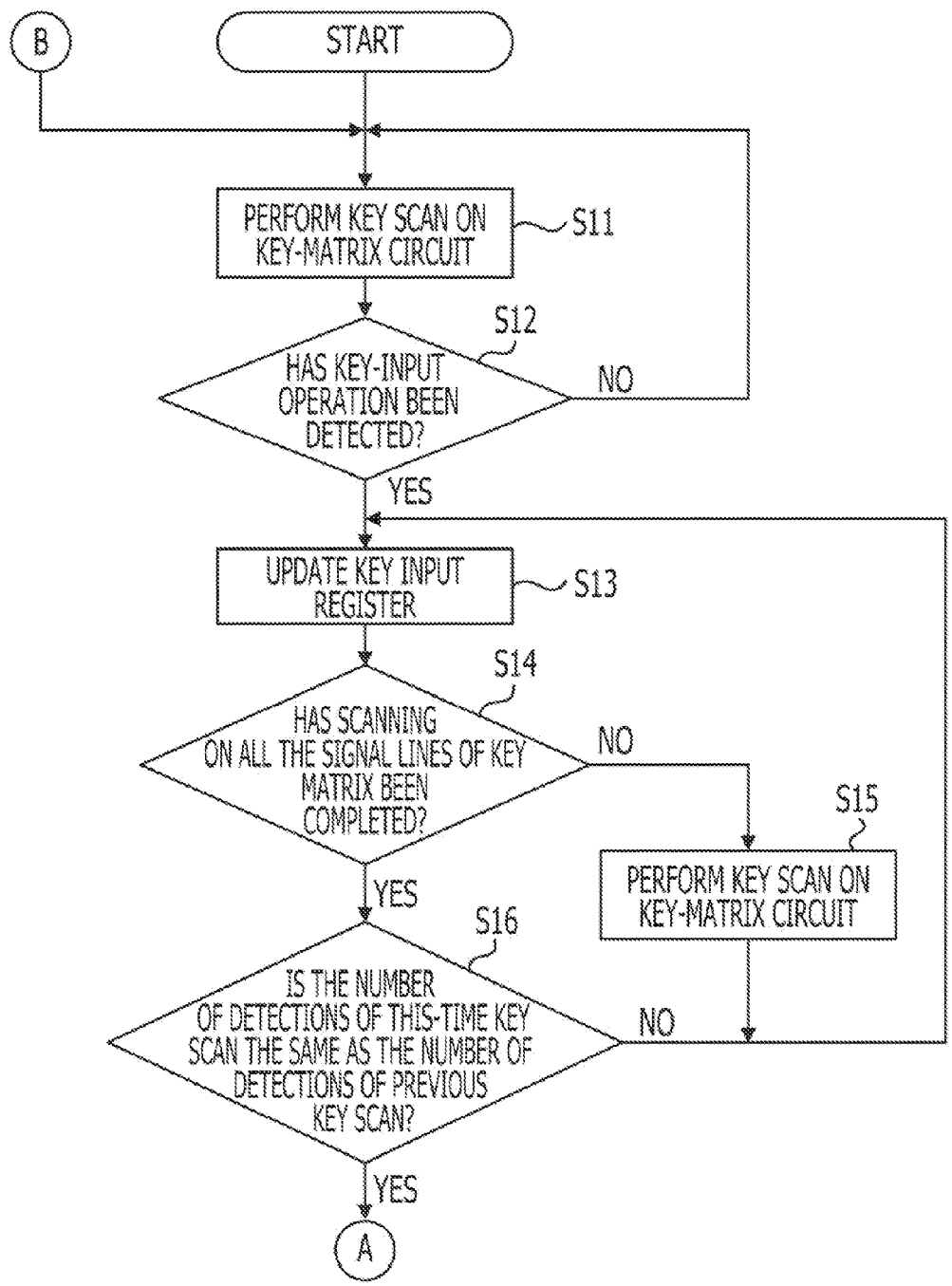
FIG. 12 constitutes a flowchart illustrating key-input determination processing according to the second embodiment.
Figure 13:
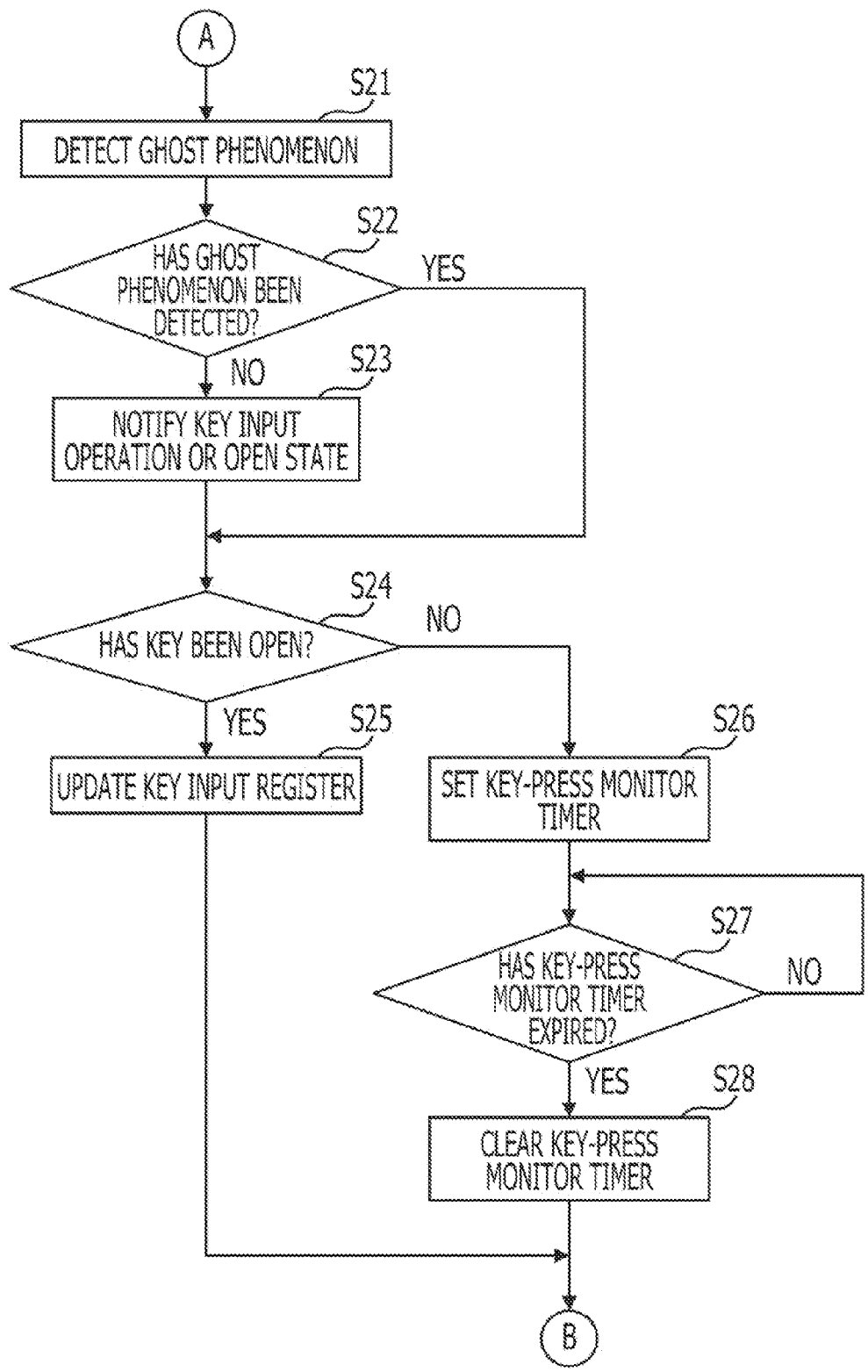
FIG. 13 constitutes a flowchart illustrating key-input determination processing according to the second embodiment.

FIG. 12 and FIG. 13 constitute a flowchart illustrating key-input determination processing according to the second embodiment. The key-input determination processing is processing performing key scan on the key matrix circuit 101a2 of the mobile terminal apparatus 100 so as to accept an input operation, such as a direction input operation, for example. A description will be given of the key-input determination processing shown in FIG. 12 and FIG. 13 in the sequence of step numbers of the flowchart. The key-input determination processing is performed, for example, in a state in which the mobile terminal apparatus 100 is capable of accepting a user's key operation after completion of starting the mobile terminal apparatus 100.

Step S11: The key-matrix control unit 111a outputs the low-level signal on the input side of the signal lines KBC1 and KBC2 of the key matrix circuit 101a2. The key-matrix control unit 111a detects detection signals from the signal lines KBR0 and KBR5, and performs key scan to detect an input-operated key.

Step S12: The key-matrix control unit 111a determines whether a key input operation has been detected in the key scan in step S11. If the input operation has been detected (YES in step S12), the processing proceeds to step S13. If the input operation has not been detected (NO in step S12), the processing proceeds to step S11.

Step S13: The key-matrix control unit 111a updates a value of a key input register, held by the key-matrix control unit 111a, indicating a key on which input operation has been detected on the basis of the key scan. In this regard, it is assumed that a value of the input register before update is also held in a memory possessed by the key-matrix control unit 111a. The key input register has either one of a value indicating the input-operated key, and a value indicating that no key has been input-operated, namely, a value indicating "open".

Step S14: The key-matrix control unit 111a determines whether the scan has been completed for all the signal lines of the key matrix or not. If the scan has been completed (YES in step S14), the processing proceeds to step S16. On the other hand, if the scan has not been completed (NO in step S14), the processing proceeds to step S15.

Step S15: The key-matrix control unit 111a performs the key scan in the same manner as in step S11.

Step S16: The key-matrix control unit 111a refers to a value of the key input register, and a held value of the key input register before the update, and compares the number of detection of input operations by the previous key scan and the number of detection of input operations by the key scan at this time in order to determine whether they are identical or not. If the numbers of detection of the operations are identical (YES in step S16), the processing proceeds to step S21. On the other hand, if the numbers of detection of the operations are different (NO in step S16), the processing proceeds to step S13.

By step S16, if the number of detected key-scan operations at this time is not identical to the number of previous detected key-scan operations, the user-input operation is determined to be unstable, the key scan in step S15 is repeated until the same number of key-scan operations is obtained continuously. Thereby, it is possible to stabilize detection of input operations.

At the time of performing the processing of step S16 the first time, it is assumed that a value of the key input register before update is "open" (state in which no key input operation has been performed), that is to say, the number of detected operation shows "0". Thereby, at the time of performing the processing of step S16 the first time, the value before the update is "0". On the other hand, a value of the key input register after the update is the number of keys of the input operation detected by the key scan in step S11, that is to say, one or more. Accordingly, the values of the key input register do not match, and thus the key scan in step S15 is repeated.

Step S21: The key-matrix control unit 111a refers to a value of the key input register, and detects a ghost phenomenon from the combination of keys from which input operations have been detected, for example. The ghost phenomenon indicates misrecognition which occurs when a user operates a plurality of keys at substantially the same time, and a phenomenon in which a key that has not been actually input-operated is detected.

In the second embodiment, it is possible to detect a diagonal-direction input operation intended by the user when one or two adjacent contact points are connected in addition to the case where a connection is made on a diagonal-direction contact point as intended by the user in the user's diagonal-direction input operation. Further, it is also possible to detect a diagonal-direction input operation when a connection is not made on the diagonal-direction contact point as intended by the user, and connections are made on two adjacent contact points. Accordingly, in the second embodiment, when a diagonal-direction input operation intended by the user may be detected, even if a connection is made on a contact point other than the diagonal-direction input operation intended by the user, it is handled that a ghost phenomenon does not occur, and an input operation is validly detected.

Step S22: The key-matrix control unit 111a determines whether a ghost phenomenon has been detected in step S21 or not. If the ghost phenomenon has been detected (YES in step S22), the processing proceeds to step S24. If the ghost phenomenon has not been detected (NO in step S22), the processing proceeds to step S23.

Step S23: The key-matrix control unit 111a refers to a value of the key input register, and notifies a key of the detected input operation, or a state that the key is open. The mobile terminal apparatus 100 or the application running on the mobile terminal apparatus 100, for example, obtains the user-input operation on the basis of this notification.

Step S24: The key-matrix control unit 111a refers to a value of the key input register, and detects whether it is in a state that the key is open or not. If the key is in an open state (YES in step S24), the processing proceeds to step S25. If it is in a state that the key is not open, that is to say, if a key input operation has been detected (NO in step S24), the processing proceeds to step S26.

Step S25: The key-matrix control unit 111a updates the value of the key input register to the open state. After that, the processing proceeds to step S11.

Step S26: The key-matrix control unit 111a set a predetermined time period (for example, 0.1 second) in the key-press monitor timer in order to adjust an interval of the key scan.

Step S27: The key-matrix control unit 111a checks elapsed time of the key-press monitor timer, and determines whether the set predetermined time has expired or not. If the predetermined time has expired (YES in step S27), the processing proceeds to step S28. If the predetermined time has not expired (NO in step S27), the processing in step S27 is repeated.

Step S28: The key-matrix control unit 111a clears the key-press monitor timer. After that, the processing proceeds to step S11.

As described above, by the mobile terminal apparatus 100 according to the second embodiment, when a corresponding input operation is performed, a direction input operation is detected using the same connection as the sum of the connections of the adjacent contact points on the right and the left so that it is possible to substantially prevent the user's operationality at the time of direction input operation from deteriorating. By the mobile terminal apparatus 100 according to the second embodiment, it is also possible to restrain the expansion of the circuit size.

It is not necessary to allocate a new key to the key matrix circuit 101a2, and thus an increase in the number of wire lines is unnecessary. Accordingly, a diagonal-direction input operation is achieved by keeping a small number of wire lines without change.

By disposing contact points accepting diagonal-direction inputs, it is possible to restrain deterioration of the user's operationality in diagonal-direction input operations.

The user's operationality in a diagonal-direction input operation is improved because a diagonal-direction input operation may also be detected in the following cases. When the user attempts to perform a diagonal-direction input operation, there is a case where a connection is made on the intended diagonal-direction input and the contact points in the perpendicular directions are in connected states, and a case where a connection is not made on the intended diagonal-direction input and the contact points in the adjacent perpendicular directions are in connected states. In the above-described cases, it is possible to detect the diagonal-direction input operation.

In the second embodiment, a description has been given by taking a mobile terminal apparatus as an example. However, this is only an example, and the present embodiment may be applied to any kinds of electronic apparatuses. For example, the present embodiment may be applied to electronic apparatuses, such as a mobile television, a portable video game machine, an electronic dictionary, a notebook-sized computer, and a PDA. Also, the present embodiment is not necessarily limited to be applied to these apparatuses.

In the above, a description has been given of the disclosed electronic apparatus, the input detection circuit, and the method of detecting an input on the basis of the embodiments illustrated in the figure. However, the above description serves to simply explain the principle of the present embodiment. It is possible for those skilled in the art to make various changes and modifications to the disclosed technique, and thus the present embodiment is not limited to the above-described and explained precise configuration and applications. Each component of the configuration may be replaced by any component having substantially the same functions. Also, any other configuration and process may be added to the disclosed technique. Also, the disclosed technique may be implemented by the combination of any two configurations or more from the embodiment described above. Also, all variations and equivalent arrangements corresponding to the disclosed technique should be considered to be within the scope of the present embodiment by the appended claims and the equivalents thereof.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. An electronic apparatus for detecting an input operation using a plurality of contact points, the electronic apparatus comprising:
an input key unit;
a detection-circuit control unit; and
a detection circuit, wherein the detection circuit includes
a plurality of contact points, the contact points include at least
a first contact point capable of changing between a connected state in which a first signal line and a second signal line are electrically connected, and an open state in which the first signal line and the second signal line are not electrically connected,
a second contact point capable of changing between a connected state in which the first signal line and the second signal line are electrically connected and the second signal line and a third signal line are electrically connected, and an open state in which the first signal line and the second signal line are not electrically connected and the second signal line and the third signal line are not electrically connected, and
a third contact point capable of changing between a connected state in which the second signal line and the third signal line are electrically connected, and an open state in which the second signal line and the third signal line are not electrically connected, and
a rectifier preventing a short circuit between the first signal line and
the third signal line when the second contact point is changed to the connected state, wherein
the input key unit changes states of the plurality of contact points based on an accepted input operation, and
the detection-circuit control unit obtains a detection signal corresponding to changed states of the plurality of contact points from the detection circuit, and detects the input operation from the obtained detection signal.

2. The electronic apparatus according to claim 1,
wherein the input operation is a direction input operation input on the input key unit, and
when the input key unit accepts a direction input operation of a direction adjacent to a direction of a direction input operation detected by a connection of the first contact point and adjacent to a direction of a direction input operation detected by a connection of the third contact point, the input key unit changes the second contact point to the connected state.

3. The electronic apparatus according to claim 2,
wherein the input key unit is capable of accepting a direction input operation in a diagonal direction,
the second contact point is changed to a connected state in accordance with the direction input operation in the diagonal direction, and
the detection-circuit control unit obtains a detection signal output from the detection circuit, and detects a direction input operation in the diagonal direction from the obtained detection signal.

4. The electronic apparatus according to claim 1,
wherein the detection circuit further includes
a fourth contact point capable of changing between a connected state in which the second signal line and the third signal line are electrically connected and the third signal line and a fourth signal line are electrically connected, and an open state in which the second signal line and the third signal line are not electrically connected and the third signal line and the fourth signal line are not electrically connected,
a fifth contact point capable of changing between a connected state in which the third signal line and the fourth signal line are electrically connected, and an open state in which the third signal line and the fourth signal line are not electrically connected,
a sixth contact point capable of changing between a connected state in which the first signal line and the fourth signal line are electrically connected and the third signal line and the fourth signal line are electrically connected, and an open state in which the first signal line and the fourth signal line are not electrically connected and the third signal line and the fourth signal line are not electrically connected,
a seventh contact point capable of changing between a connected state in which the first signal line and the fourth signal line are electrically connected, and an open state in which the first signal line and the fourth signal line are not electrically connected, and
an eighth contact point capable of changing between a connected state in which the first signal line and the second signal line are electrically connected and the first signal line and the fourth signal line are electrically connected, and an open state in which the first signal line and the second signal line are not electrically connected and the first signal line and the fourth signal line are not electrically connected,
the input key unit is capable of accepting a direction input operation in eight directions, and changes states of the plurality of contact points based on the accepted input operation in the eight directions, and
the detection-circuit control unit obtains a detection signal corresponding to changed states of the plurality of contact points from the detection circuit, and detects the direction input operation in the eight directions from the obtained detection signal.

5. A method of detecting an input of an input operation using a plurality of contact points, the method comprising:
changing states of the plurality of contact points held by a detection circuit based on an accepted input operation, changing the states includes
changing a first contact point between a connected state in which a first signal line and a second signal line are electrically connected, and an open state in which the first signal line and the second signal line are not electrically connected,
changing a second contact point between a connected state in which the first signal line and the second signal line are electrically connected and the second signal line and a third signal line are electrically connected, and an open state in which the first signal line and the second signal line are not electrically connected and the second signal line and the third signal line are not electrically connected, and
changing a third contact point between a connected state in which the second signal line and the third signal line are electrically connected, and an open state in which the second signal line and the third signal line are not electrically connected;
preventing, using a rectifier, a short circuit between the first signal line and the third signal line when the second contact point is changed to the connected state;
obtaining a detection signal corresponding to changed states of the plurality of contact points from the detection circuit; and
detecting the input operation from the obtained detection signal.

* * * * *